United States Patent [19]
Murata

[11] Patent Number: 5,535,013
[45] Date of Patent: Jul. 9, 1996

[54] IMAGE DATA COMPRESSION AND EXPANSION APPARATUS, AND IMAGE AREA DISCRIMINATION PROCESSING APPARATUS THEREFOR

[75] Inventor: Kazuyuki Murata, Kyoto, Japan

[73] Assignee: Matsushita Electric Industrial Co., Ltd., Osaka, Japan

[21] Appl. No.: 308,517

[22] Filed: Sep. 21, 1994

Related U.S. Application Data

[63] Continuation of Ser. No. 870,458, Apr. 17, 1992, abandoned.

[30] Foreign Application Priority Data

Apr. 19, 1991 [JP] Japan ................................. 3-088482

[51] Int. Cl.⁶ ................................................. H04N 1/40
[52] U.S. Cl. ........................... 358/432; 358/462; 358/433; 358/335
[58] Field of Search ................................. 358/335, 310, 358/342, 432, 456, 462, 467, 433; 348/403, 423; H04N 1/40

[56] References Cited

U.S. PATENT DOCUMENTS

| | | | |
|---|---|---|---|
| 5,016,118 | 5/1991 | Nannichi | 358/462 |
| 5,018,024 | 5/1991 | Tanioka | 358/456 |
| 5,101,280 | 3/1992 | Moronaga et al. | 358/432 |
| 5,101,438 | 3/1992 | Kanda et al. | 358/432 |
| 5,162,923 | 11/1992 | Yoshida et al. | 358/432 |
| 5,177,795 | 1/1993 | Tanioka et al. | 358/462 |

FOREIGN PATENT DOCUMENTS

| | | |
|---|---|---|
| 62-1500472 | 7/1987 | Japan . |
| 64-41377 | 2/1989 | Japan . |
| 64-51884 | 2/1989 | Japan . |
| 3-45083 | 2/1991 | Japan . |

OTHER PUBLICATIONS

JPEG Technical Specification, Revision 6, Jun. 24, 1990.
IEEE Transactions On Communications, vol. COM-25, No. 11, pp. 1285-1292 (Nov. 1977).

*Primary Examiner*—Thai Q. Tran
*Assistant Examiner*—Huy Nguyen
*Attorney, Agent, or Firm*—Willian Brinks Hofer Gilson & Lione

[57] ABSTRACT

An image signal compression apparatus which divides image data into plural blocks, encodes each block, orthogonally transforms the image data by each block, and outputs the transformation coefficients. Blocks which contain text and blocks which contain dot images are discriminated from the features of the absolute values of the AC coefficients, which are a subset of the transformation coefficients. One of plural quantization tables is selected for each block based on the discrimination result, and by adaptively quantizing the transformation coefficients using the selected quantization table, text images can be reproduced free of fuzziness, and good expanded images of the dot areas can be obtained with high compression by reducing the high frequency component. When the predetermined high frequency transformation coefficients, which are a subset of the above transformation coefficients, are greater than the predetermined low frequency transformation coefficients and a predefined threshold value, the block is discriminated to include a dot image area. When the predetermined low frequency transformation coefficients, which are a subset of the above transformation coefficients, are greater than a predefined threshold value, the block is discriminated to include a text image area.

15 Claims, 17 Drawing Sheets

| S1 | S0 | Chosen data input |
|----|----|-------------------|
| 0  | 0  | A                 |
| 0  | 1  | B                 |
| 1  | 0  | C                 |

| 16 | 11 | 10 | 16 | 24 | 40 | 51 | 61 |
| --- | --- | --- | --- | --- | --- | --- | --- |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

16
IMAGE DATA COMPRESSION AND EXPANSION APPARATUS, AND IMAGE AREA DISCRIMINATION PROCESSING APPARATUS THEREFOR

This a continuation divisional application of application Ser. No. 07/870,458 filed Apr. 17, 1992, abandoned

BACKGROUND OF THE INVENTION

1. Field of the Invention

The present invention relates to an image signal compression apparatus which encodes and compresses image data, and an image signal expansion apparatus which decodes and expands compressed image data, and relates specifically to an image data compression and expansion apparatus which, when there are text areas, dot areas, or halftone areas in a whole image, applies optimal compression processing to each area and obtains a high quality expanded signal. The present invention further relates to an image area discrimination processing apparatus which discriminates the distinct image areas when there are text areas, dot areas, or halftone areas in a whole image to apply optimized image processing.

2. Description of the Prior Art

The application of static image compression and expansion devices and image area discrimination processing devices in facsimiles, electronic filing systems, digital copiers, and other electronic image management systems has been studied in recent years due to the demand for an image data compression and expansion apparatus that can process halftone and color static images containing both text and non-text image areas with a high compression rate while obtaining a high quality expanded image, and for an image area discrimination processing device enabling processing optimized to the image area.

A conventional image data compression and expansion apparatus is described hereinbelow with reference to the accompanying figures.

FIG. 18 is a block diagram of a conventional image data compression apparatus comprising an image blocking circuit 2 which divides the input image data into blocks of eight pixels square (8×8 pixels), and outputs the blocked image signal 3. The discrete cosine transformation circuit 4 applies two-dimensional discrete cosine transform to the blocked image signal 3, and outputs the transformation coefficients 5. The transformation coefficients $K_{ij}$ in the blocks converted by the discrete cosine transformation circuit 4 are arrayed as shown in FIG. 19. $K_{00}$ is the direct current transformation coefficient (hereinafter the DC coefficient), and all values other than $K_{00}$ are alternating current transformation coefficients (hereinafter the AC coefficients). The greater the values of i and j, the higher the spatial frequency of the transformation coefficient.

The quantization circuit 6 applies linear quantization to the transformation coefficients 5 of each block using a predetermined quantization table with a quantization step which has different values in accordance with the position of each transformation coefficient. An example of this quantization table is shown in FIG. 20. The differential circuit 8 outputs the differential value 9 between the DC coefficient quantized for the one previous block and the DC coefficient 7 quantized for the current block. The variable length coding circuit 10 applies a variable length coding, e.g., run length coding or Huffman coding, based on the probability of occurrence of the differential value 9.

The zigzag scan circuit 12 scans the quantized AC coefficients 11 for each block in the order shown in FIG. 21. The variable length coding circuit 13 applies variable length coding, e.g., run length coding or Huffman coding, to the zigzag scanned quantized AC coefficients 18. The multiplexing circuit 14 multiplexes the variable length coded difference 16 and AC coefficient 17, and outputs the encoded image data 15.

FIG. 22 is a block diagram of a conventional image data expansion apparatus.

The encoded image data 15 is the data encoded by the image data compression apparatus described above. The separation circuit 21 outputs the differential value 22, which is obtained by variable length coding the differential value 9 of the encoded image data 15, and outputs the variable length coded AC coefficient 23. The variable length decoding circuit 24 decodes the differential value 22 and outputs the quantized differential value 25. The differential decoding circuit 26 decodes the DC coefficient 27 quantized from the quantized difference 25. The variable length decoding circuit 28 decodes the variable length coded AC coefficient 23, and outputs the quantized AC coefficient 29. The raster scan transformation circuit 30 converts the order of the zigzag scanned quantized AC coefficients 29 to a normal raster sequence, and outputs the raster scanned quantized AC coefficients 31. The inverse quantization circuit 32 inverse quantizes for each block the quantized transformation coefficients obtained from the quantized AC coefficients 31 and the quantized DC coefficient 27, and outputs the inverse quantized transformation coefficients 33. The discrete cosine inverse transformation circuit 34 applies discrete cosine inversion to the inverse quantized transformation coefficients 33, and outputs the expanded image data 35 (for reference, see JPEG Technical Specification Revision 6, Jun. 24, 1990).

However, in a conventional image compression and expansion apparatus as described above, the text areas of the image data tend to become fuzzy and noise is introduced to the white background around the text in the expanded image signal if the quantization steps of the quantization table are large, because only a single quantization table is used for any single image. Conversely, if the quantization steps of the quantization table are small, the compression rate of the image data drops. Furthermore, if there are dot patterns in the image data, the compression rate of the image data also drops, because the absolute value of the high frequency AC coefficient after an orthogonal transform (such as a discrete cosine transform) increases.

The construction and operation of a conventional image area discrimination apparatus is described hereinbelow with reference to the accompanying figures.

FIG. 23 is a block diagram of a conventional image area discrimination apparatus. The RGB color signals, which are obtained by scanning the original, are input in parallel to a halftone image filtering circuit 601, a binary image filtering circuit 602, and an area discrimination circuit 610. The halftone image filtering circuit 601 is a two-dimensional filter which applies band emphasis processing, assuming that the target image area is a halftone image area. The frequency characteristics of this filter are set to eliminate any dot components and enhance the sharpness of image.

The image filtering circuit 602 applies edge component emphasizing processing for text images, assuming that the target image area is a binary image area. The binarization circuit 603 digitizes the RGB color signals with each respective threshold only when the hue signals r1, g1, and b1, output from the hue discrimination circuit 605, (described below) are ON; when the hue signals r1, g1, and b1 are OFF, the RGB color signals are output unmodified.

The binary image data thus obtained from the halftone image filtering circuit 601 and the binarization circuit 603 is then selectively output to an appropriate processing circuit by the selector circuit 604 in response to a discrimination signal from an area discrimination circuit 610, which is described below.

The area discrimination circuit 610 comprises a hue discrimination circuit 605, a threshold value storage ROM 606 that stores the threshold values used for area discrimination, a signal synthesis circuit 607, an edge signal generator 608, and a comparator 609. The signal synthesis circuit 607 generates a luminance signal from the RGB color signals and outputs it as a synthesis signal d.

The synthesis signal d is input to the edge signal generator 608, which computes the difference between the maximum and minimum values in the 3×3 pixel window of which the center is the target pixel, and outputs an edge signal e. The comparator 609 compares the edge signal e with a predetermined threshold value; if the edge signal e is greater than the threshold value, the comparator 609 outputs a "1" indicating a binary image area, and if less than the threshold value outputs a "0" indicating a halftone image area, to the selector circuit 604. The hue discrimination circuit 605 identifies the hue of the target pixel as one of seven hues, i.e., yellow, magenta, cyan, black, red, green, or blue, and outputs the color hue signals r1, g1, and b1. The threshold value storage ROM 606 outputs to the comparator 609 the identified 8-bit threshold value corresponding to the hue for area discrimination by reading the value at the address defined by the color hue signals r1, g1, and b1.

The comparator 609 compares the threshold value for each hue with the edge signal e from the edge signal generator 608 to determine whether the target area is a halftone image or text area; the selector circuit 604 thus selects the signal to which was applied the processing suitable for the respective area, and outputs the result as signals r, g, b to the color correction and under color removal circuit 611. The color correction and under color removal circuit 611 applies correction to compensate for any muddying of the colors, applies under color removal, and generates the cyan (C), magenta (M), yellow (Y), and black (K) signals. A color printer (not shown) then reproduces the original image on the recording medium with a coloring agent corresponding to each color (See, for example, Japanese patent laid-open publication No. S64-41377)

When it is attempted to discriminate a text area having somewhat small edge components using the area discrimination apparatus as thus described, halftone image area of relatively large edge components or dot pattern area is falsely identified as text area, and, accordingly, halftone image cannot be faithfully reproduced. In addition, when the apparatus is set to avoid such a false discrimination, it is only possible to discriminate text areas with sufficiently large edge components, and reproduction of text areas deteriorates. Furthermore, because dot pattern areas cannot be detected even when they are present in the image signal, processing suitable for dot areas cannot be applied thereto.

SUMMARY OF THE INVENTION

Therefore, an object of the present invention is to provide an image data compression and expansion apparatus which can reproduce good text images in the expanded image, and which images containing dot image areas can still obtain a good expanded image by reducing the high frequency component without lowering the compression rate.

A further object of the present invention is to provide an image area discrimination processing apparatus which can detect dot areas in the image signal without falsely identifying text areas with a small edge component, or without identifying dot image areas as text areas.

To achieve the aforementioned objects, an image compression apparatus according to the present invention comprises an orthogonal transformation means which orthogonally transforms by block the image data divided into blocks and outputs the transformation coefficients, and an appropriate quantization means which discriminates from the features of the absolute values of the AC transformation coefficients in the above transformation coefficients one of a plurality of specific block types, including at least a block containing a text image and a block containing a dot image, selects one of a plurality of quantization tables based on the discrimination result, and applies quantization to the transformation coefficients using the selected quantization table.

An image expansion apparatus according to the present invention which expands the image signal compressed by the above image compression apparatus comprises an inverse quantization means to inverse quantize the quantized transformation coefficients for each block using the quantization steps used for quantization, and a DC inverse transformation means to orthogonally inversely transform the inverse quantized transformation coefficients.

An image expansion apparatus thus comprised according to the present invention detects the features of the transformation coefficients after orthogonal transformation and quantizes or inverse quantizes the transformation coefficients using an optimized quantization table even when text areas and dot pattern areas are contained in the image data, and is thus able to reproduce a good text image in the expanded image, and can obtain a good expanded image even when dot image areas are contained in the image data by reducing the high frequency components without lowering the compression rate.

Furthermore, an image area discrimination processing apparatus according to the present invention comprises an orthogonal transformation means which divides image data containing text areas, dot areas, and halftone areas into plural blocks, orthogonally transforms by each block the image data divided into plural blocks and outputs the transformation coefficients, a dot area discrimination means which identifies the block as a dot image area when the sum of predetermined high frequency components is greater than the sum of the coefficients of the specified low frequency components in the transformation coefficients, and a text area discrimination means which identifies the block as a text image area when the sum of the coefficients of the specified low frequency components in the transformation coefficients is greater than a predetermined threshold value and that area is not identified as a dot area.

An image area discrimination processing apparatus thus comprised according to the present invention can discriminate text areas and dot areas without false discrimination from the features of the absolute values of the AC transformation coefficients after orthogonal transformation even when text areas and dot image areas are contained in the image data.

In addition, an image area discrimination processing apparatus according to the present invention comprises an orthogonal transformation means which divides image data into plural blocks, orthogonally transforms by each block the image data divided into plural blocks and outputs the transformation coefficients, an appropriate scaling means which discriminates from the features of the absolute values of the AC transformation coefficients in the above transformation coefficients one of plural specific block types, including at least a block containing a text image and a block containing a dot image, selects one of plural scaling tables based on the discrimination result, and multiplies the transformation coefficients by the scaling coefficients selected from the scaling table, and an orthogonal inverse transformation means which applies orthogonal inverse transformation to the scaled transformation coefficients.

An image area discrimination processing apparatus thus comprised according to the present invention can process image data in the discriminated text areas without losing the edge components, and can obtain smooth gradation of image data in the discriminated dot area by suppressing the high frequency components.

BRIEF DESCRIPTION OF THE DRAWINGS

The present invention will become more fully understood from the detailed description given below and the accompanying diagrams wherein:

FIG. 10 is an example of the quantization table values, FIG. 11 is a table of the relationship between data inputs selected as the selected input of the selector 89 in FIG. 3, FIG. 16 is an example of the scaling coefficient table data.

DETAILED DESCRIPTION OF THE PREFERRED EMBODIMENTS

The preferred embodiments of an image data compression and expansion apparatus and image area discrimination processing apparatus according to the present invention are described hereinbelow with reference to the accompanying figures.

Figure 1:
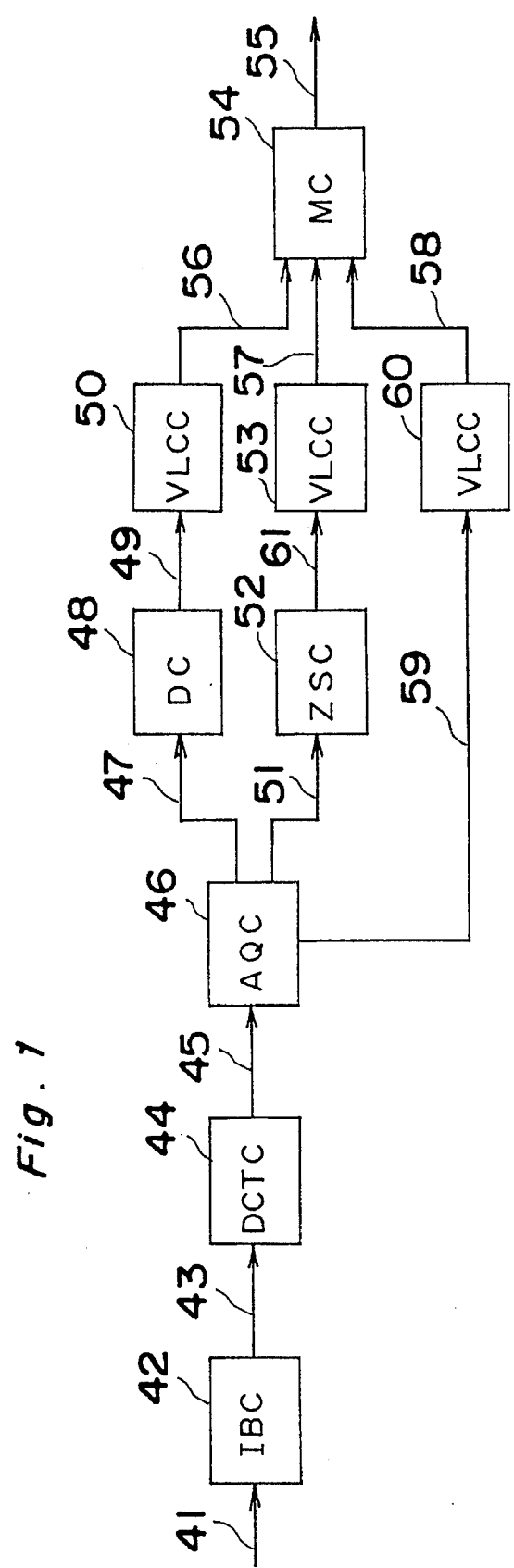
FIG. 1 is a block diagram of an image compression apparatus according to a first embodiment of the present invention.
Figures 19, 20:
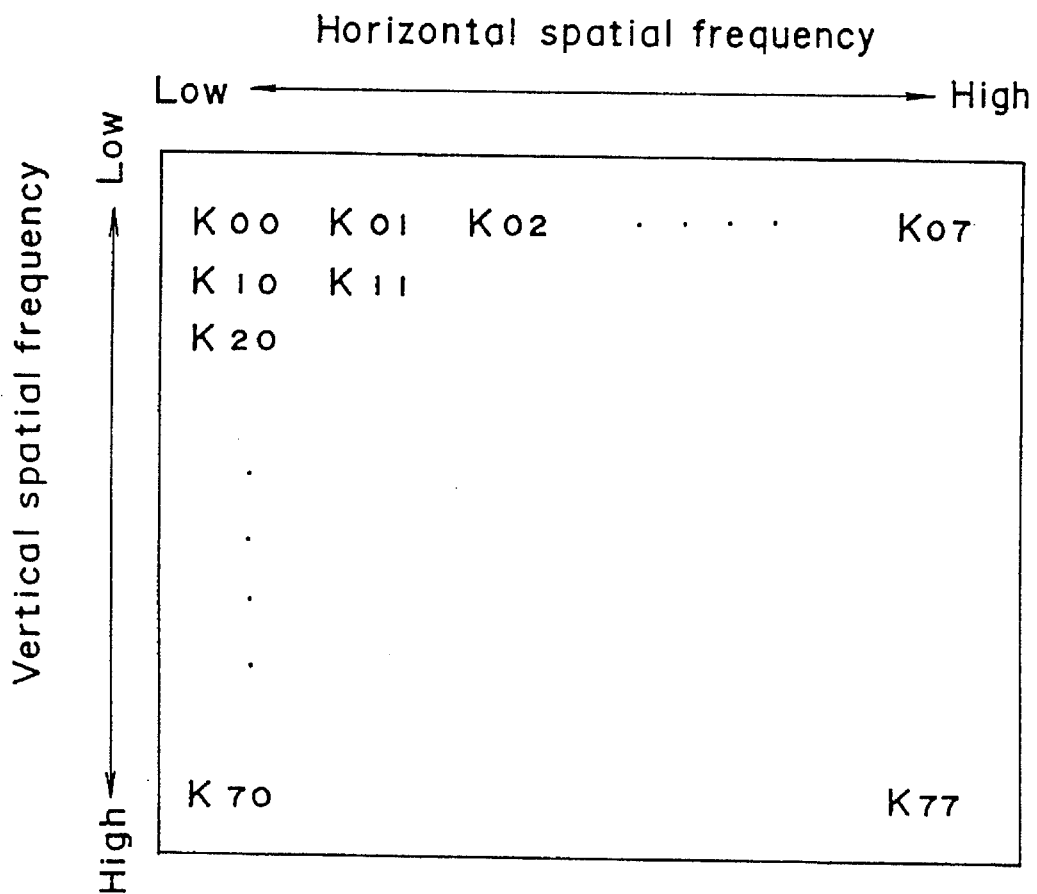
FIG. 19 is an example of the transformation coefficients array after discrete cosine transform.
FIG. 20 is a figure showing the quantization table data.

FIG. 1 is a block diagram of an image compression apparatus according to a first embodiment of the present invention. As shown in FIG. 1, an image blocking circuit 42 divides the input image data 41 into blocks of eight pixels square (8×8 pixels), and outputs the blocked image signal 43. The discrete cosine transformation circuit 44 applies two-dimensional discrete cosine transform to the blocked image signal 43, and outputs the transformation coefficients 45. The transformation coefficients $K_{ij}$ in the blocks converted by the discrete cosine transformation circuit 44 are arrayed as shown in FIG. 19. $K_{00}$ is the direct current transformation coefficient (hereinafter the DC coefficient), and all values other than $K_{00}$ are alternating current transformation coefficients (hereinafter the AC coefficients). The greater the values of i and j, the higher the spatial frequency of the transformation coefficient.

The adaptive quantization circuit 46, which is the adaptive quantization means, applies linear quantization of each block using a predetermined quantization table at a different quantization step for each transformation coefficient position, using the adaptive quantization table selected from a plurality of predefined quantization tables based on the features of the transformation coefficients 45 for each block, and outputs the quantized DC coefficient 47 and quantized AC coefficients 51. The adaptive quantization circuit 46 outputs a quantization table selection signal 59 identifying which quantization table was used for quantization. The difference circuit 48 outputs the differential value 49 between the DC coefficient quantized for the one previous block and the DC coefficient 47 quantized for the current block. The variable length coding circuit 50 applies variable length coding, e.g., run length coding or Huffman's coding, based on the probability of occurrence of the differential value 49.

Figure 21:
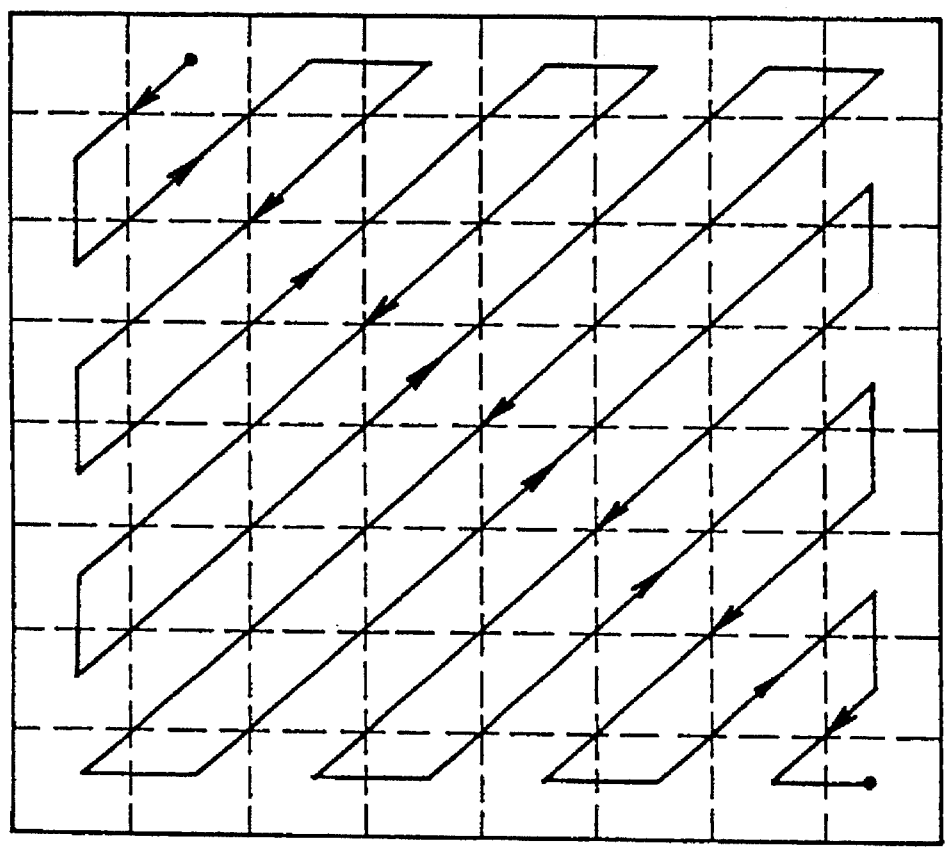
FIG. 21 is a figure showing the scanning sequence of the zigzag scan.
Figure 22:
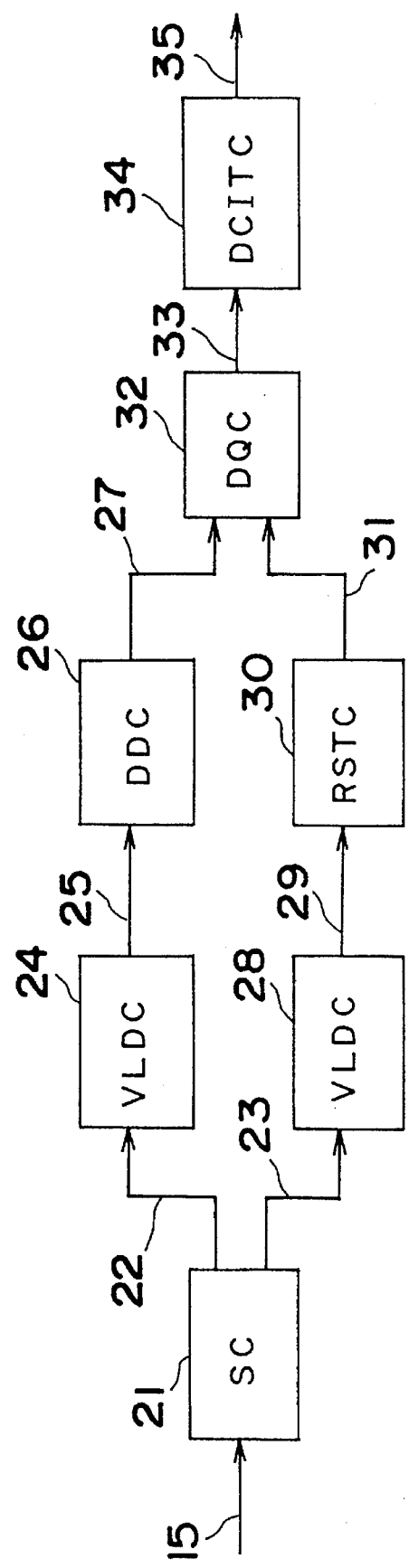
FIG. 22 is a block diagram of a conventional image signal expansion apparatus.
Figure 23:
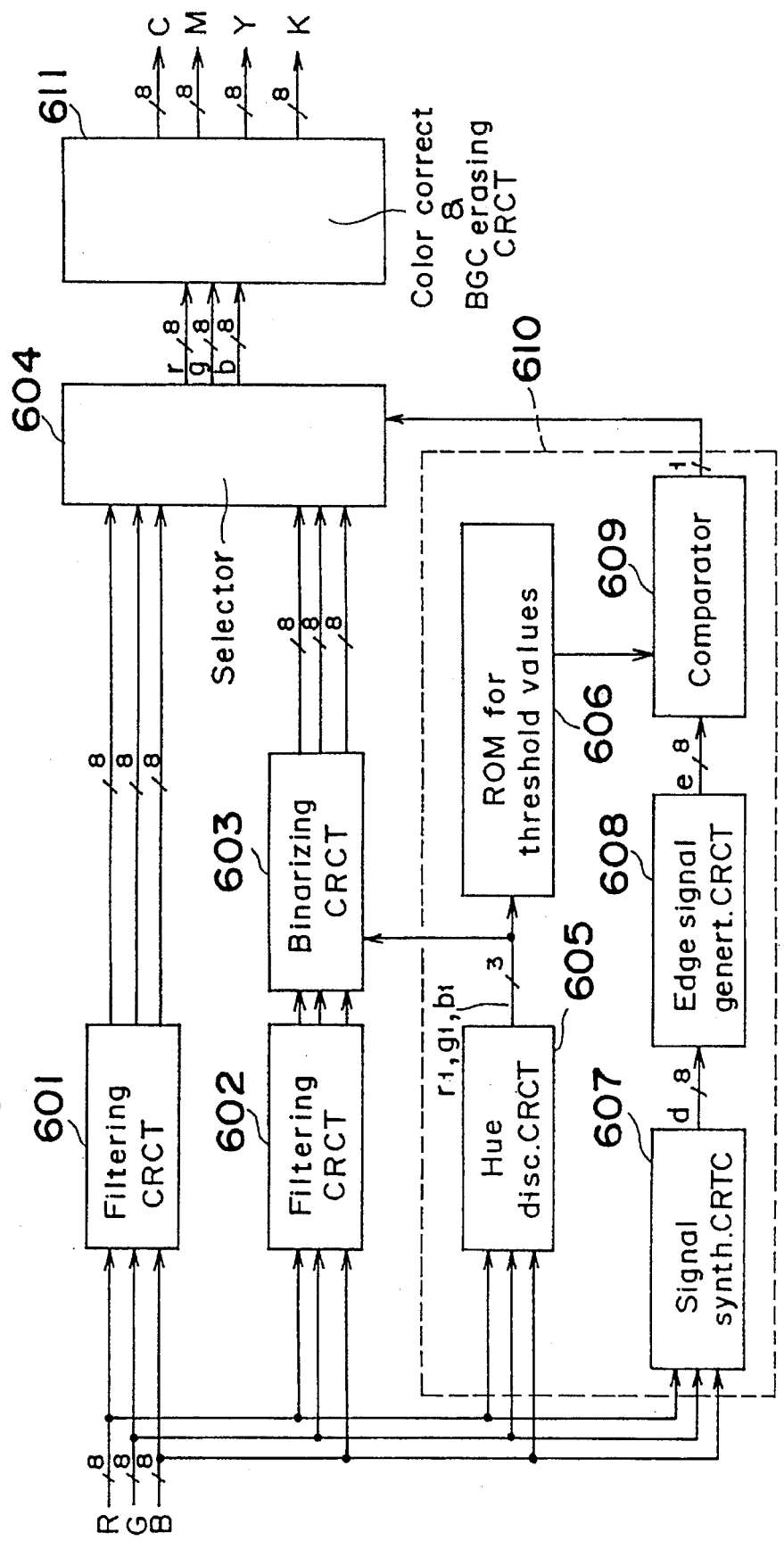
FIG. 23 is a block diagram of a conventional image area discrimination apparatus.

The zigzag scan circuit 52 scans the quantized AC coefficients 51 for each block in the order shown in FIG. 21. The variable length coding circuit 53 applies variable length coding, e.g., run length coding or Huffman's coding, to the zigzag scanned quantized AC coefficients 61. The variable length coding circuit 60 applies variable length coding, e.g., run length coding or Huffman's coding, to the quantization table selection signal 59. The multiplexing circuit 54 multiplexes the variable length encoded difference 56, AC coefficient 57, and quantization table selection signal 58, and outputs the encoded image data 55.

The adaptive quantization circuit 46 shown in FIG. 1 is described in further detail below with reference to the figures.

Figure 2:
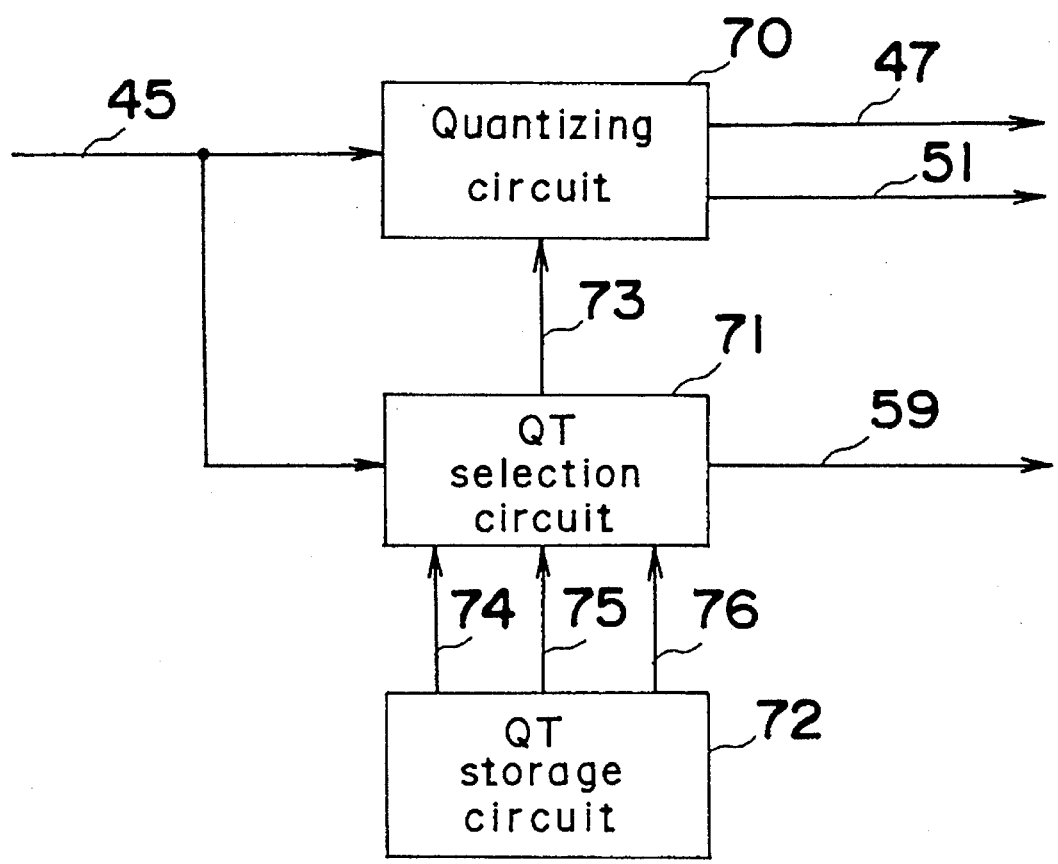
FIG. 2 is a block diagram of the adaptive quantization circuit 46 in FIG. 1.
Figures 10A, 10B, 10C, 11:
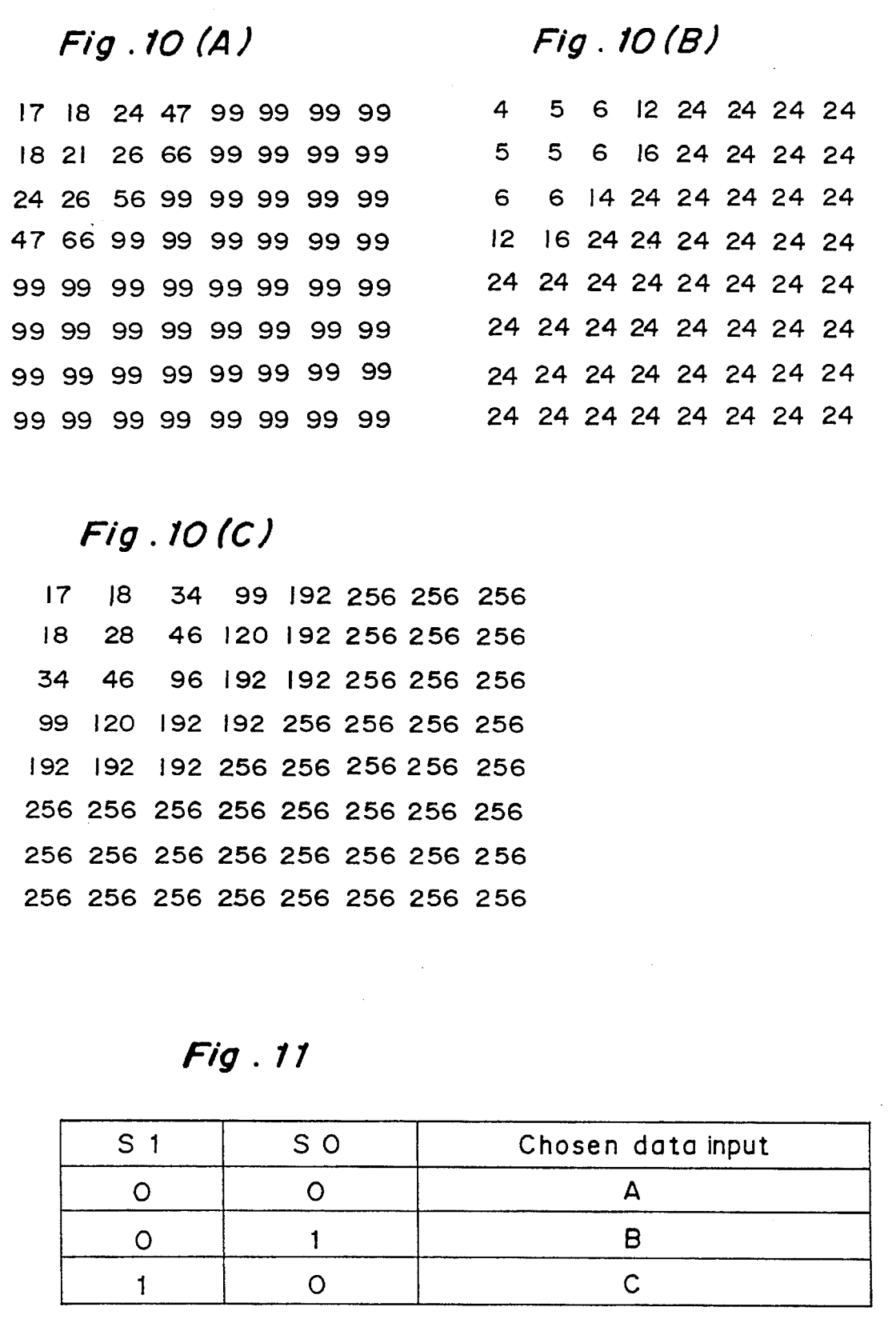

FIG. 2 is a block diagram of the adaptive quantization circuit 46, which comprises a quantization table storage circuit 72 to store the quantization tables, and, in the present embodiment, specifically stores three quantization tables. These three quantization tables are shown in FIGS. 10(A), 10(B), and 10 (C). The quantization table storage circuit 72 outputs the quantization table data signal 74, which is the quantization table corresponding to FIG. 10(A). Similarly, the quantization table storage circuit 72 may also output quantization table data signals 75 and 76, which are the quantization tables corresponding to FIGS. 10(B) and 10(C).

The quantization table selection circuit 71, which is the means of selecting the quantization tables, selects either quantization table data signal 74, 75, or 76 according to the features of the transformation coefficients 45, and outputs the selected quantization table data signal 73. The quantization table selection circuit 71 also outputs the quantization table selection signal 59, which identifies which quantization table data was selected from among the three quantization table data signals 74, 75, and 76. Using the selected quantization table data signal 73, the quantization circuit 70 quantizes the transformation coefficients 45, and outputs the quantized DC coefficient 47 and AC coefficients 51.

The quantization table selection circuit 71 shown in FIG. 2 is described in further detail with reference to the figures.

Figure 3:
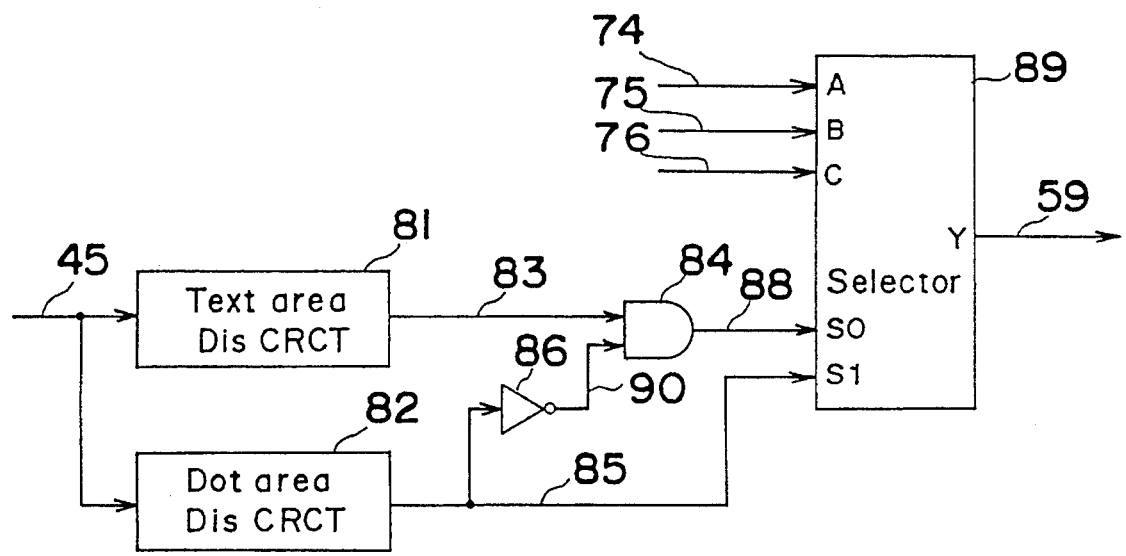
FIG. 3 is a block diagram of the quantization table selection circuit 71 in FIG. 2.

FIG. 3 is a block diagram of the quantization table selection circuit 71 in FIG. 2. Based on the features of the transformation coefficients 45, the text area discrimination circuit 81 discriminates for each block whether that block contains a text image, and outputs a HIGH discrimination signal 83 if it is determined that a text image is present. The dot area discrimination circuit 82 similarly discriminates, based on the features of the transformation coefficients 45, for each block whether that block contains a dot image, and outputs a HIGH dot discrimination signal 85 if it is determined that a dot image is present.

The inverter 86 inverts the dot discrimination signal 85 and outputs signal 90. The discrimination signal 83 and signal 90 are input to the AND gate 84, which outputs the text discrimination signal 88. The text discrimination signal 88 is HIGH when the text discrimination signal 83 is HIGH and the dot discrimination signal 85 is LOW. The text discrimination signal 88 and the dot discrimination signal 85 are input to the selection inputs S0 and S1, respectively, of the selector 89. The quantization table data signals 74, 75, and 76 are input to data inputs A, B, and C, respectively, of the selector 89. The selector 89 selects one of the three data inputs based on the selection inputs, and outputs the selected quantization table selection signal 59. The relationship between the selection inputs and the selected data inputs in the selector 89 is shown in FIG. 11.

The text area discrimination circuit 81 shown in FIG. 3 is described in further detail below with reference to the figures.

Figure 4:
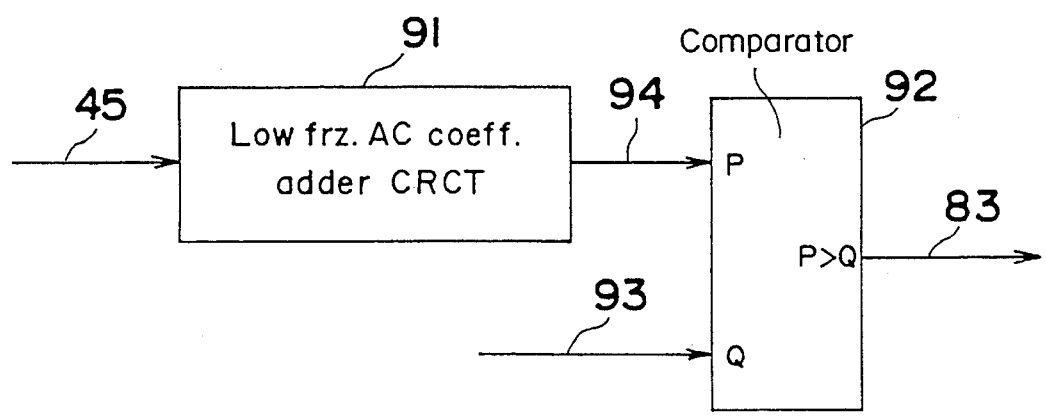
FIG. 4 is a block diagram of the text area discrimination circuit 81 in FIG. 3.
Figure 5:
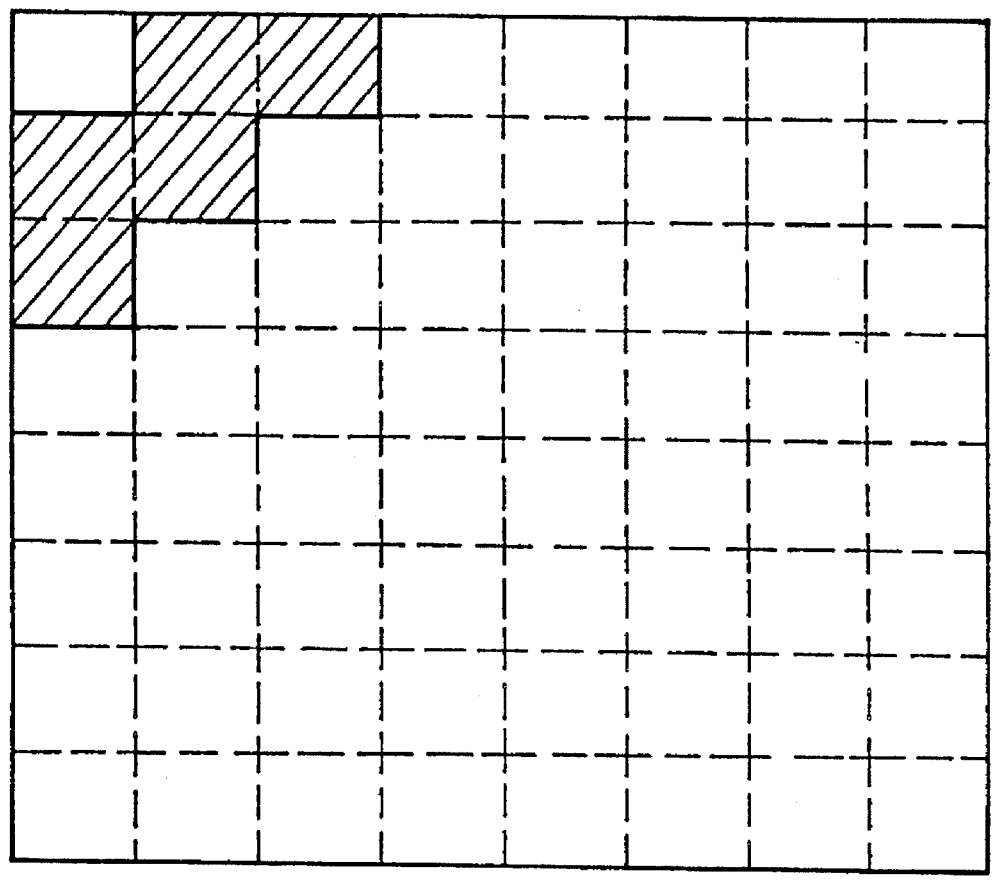
FIG. 5 shows the position of the AC coefficients used by the text area discrimination circuit 81 in FIG. 3.

FIG. 4 is a block diagram of the text area discrimination circuit 81 shown in FIG. 3. The low frequency AC coefficient adder circuit 91 calculates the sum of the absolute values of the five AC coefficients in the block shown in FIG. 5, and outputs this sum as signal 94. The comparator 92 compares the signal 94 with a predefined threshold value 93, and outputs a HIGH discrimination signal 83 if the signal 94 is greater than the predefined threshold value 93. In other words, the discrimination signal 83 is HIGH when the low frequency AC coefficients, which are the distinctive feature of the transformation coefficients when text images are contained in the block, are relatively high.

The dot area discrimination circuit 82 shown in FIG. 3 is described in further detail below with reference to the figures.

Figure 6:
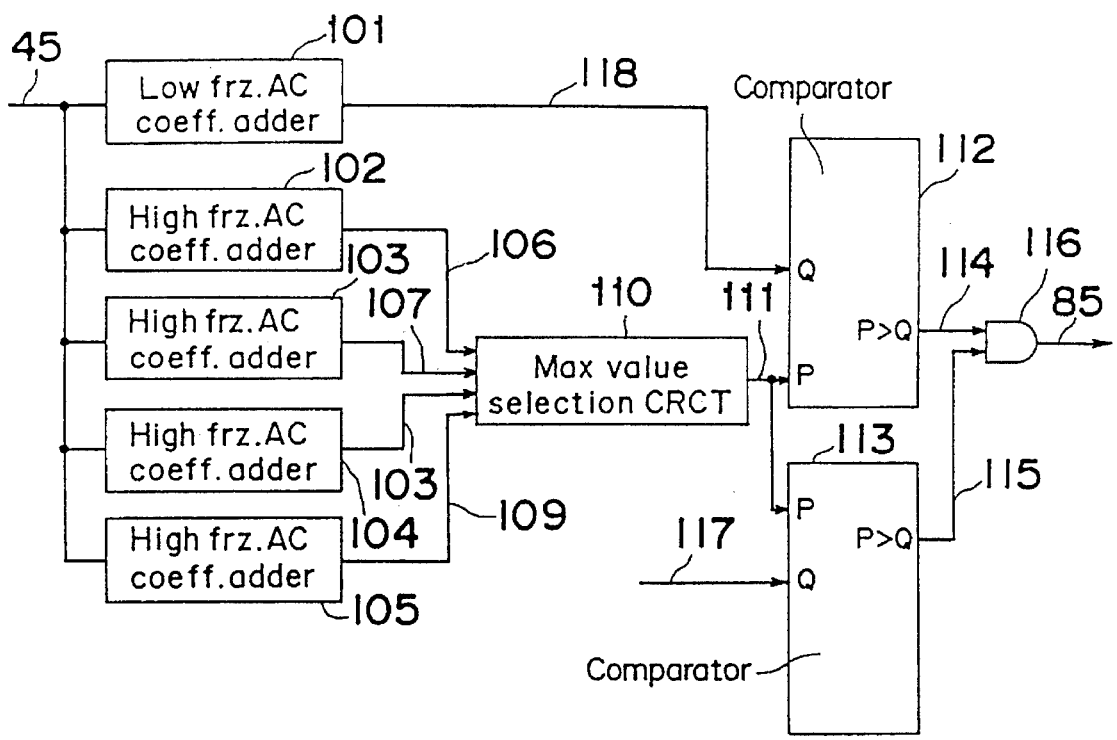
FIG. 6 is a block diagram of the dot area discrimination circuit 82 in FIG. 3.
Figure 7:
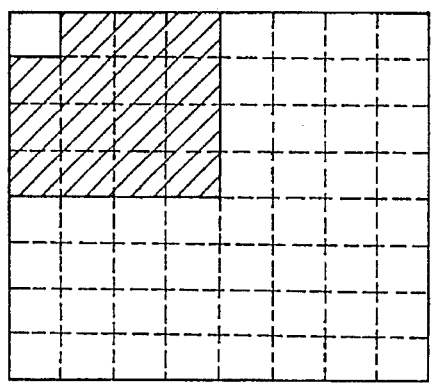
FIG. 7 shows the position of the low frequency AC coefficients used by the dot area discrimination circuit 82 in FIG. 3.
Figure 8:
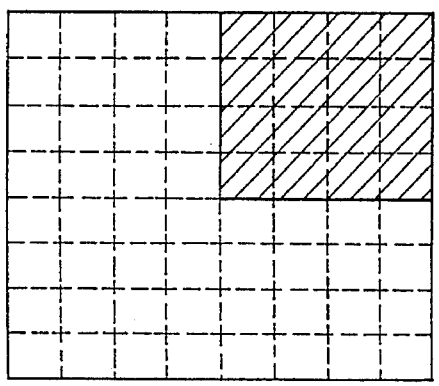
FIG. 8 shows the position of the high frequency AC coefficients used by the dot area discrimination circuit 82 in FIG. 3.
Figure 8:
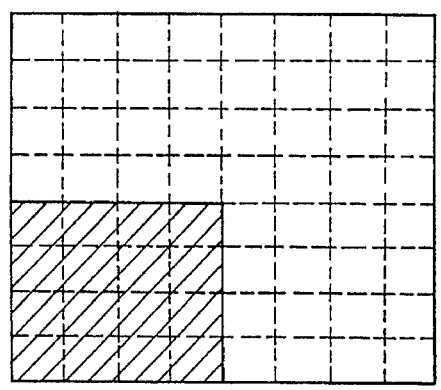
Figure 8:
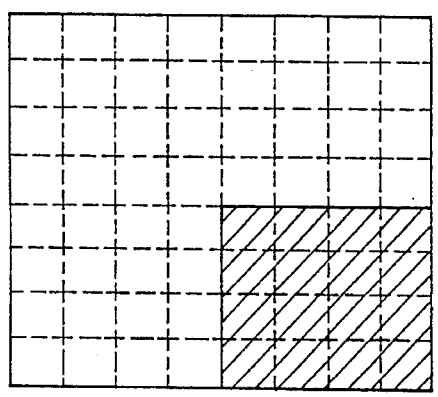
Figure 8:
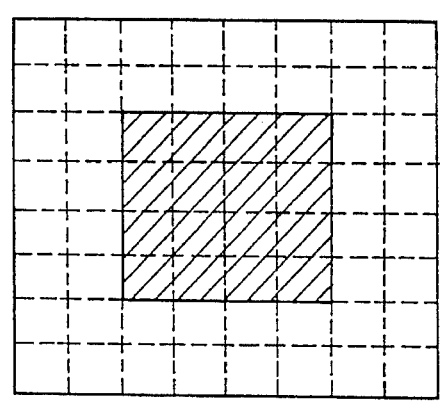

FIG. 6 is a block diagram of the dot area discrimination circuit 82 in FIG. 3. The low frequency AC coefficient adder circuit 101 calculates the sum of the absolute values of the fifteen AC coefficients in the block shown in FIG. 7, and outputs this sum as sum signal 118. The high frequency AC coefficient adder circuits 102, 103, 104, and 105 calculate the sums of the absolute values of the sixteen AC coefficients in the blocks shown in FIG. 8, and output these values as signals 106, 107, 108, and 109. The blocks shown in FIGS. 8(A), 8(B), 8(C), and 8(D) correspond to the high frequency AC coefficient adder circuits 102, 103, 104, and 105. The maximum value selection circuit 110 selects from among signals A 106, B 107, C 108, and D 109 the one signal with the highest value, and outputs the selected signal 111. The comparator 112 compares the sum signal 118 the selected signal and 111, and outputs a HIGH signal 114 if the selected signal 111 is higher than the sum signal 118. The comparator 113 compares the selected signal 111 with a predefined threshold value 117, and outputs HIGH signal 115 if selected signal 111 is higher than the threshold value 117. The AND gate 116 outputs a HIGH dot discrimination signal 85 if both signals 114 and 115 are HIGH. In other words, the dot discrimination signal 85 is HIGH if the high frequency AC coefficients, which are the distinctive feature of the transformation coefficients when a dot image is contained in the block, are greater than the low frequency AC coefficients, and the high frequency AC coefficients are greater than the predefined threshold value.

Figure 9:
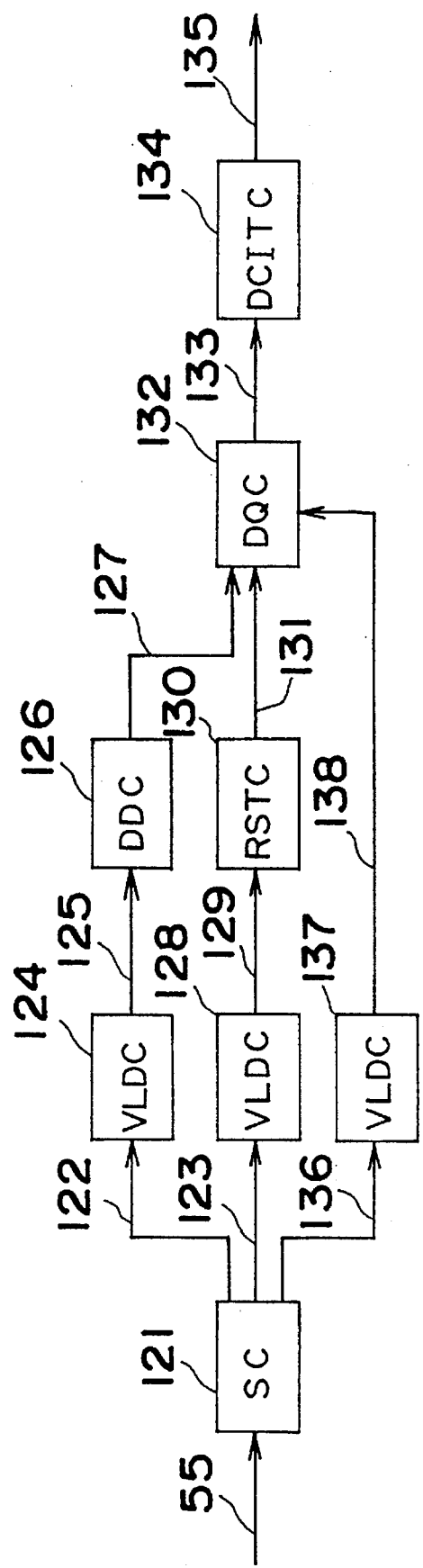
FIG. 9 is a block diagram of an image expansion apparatus according to a first embodiment of the present invention.

FIG. 9 is a block diagram of an image expansion apparatus according to a first embodiment of the present invention.

The encoded image data 55 is the data encoded by the image data compression apparatus shown in FIG. 1. The separation circuit 121 separates the variable length encoded difference, the quantized AC coefficients, and the quantization table selection signal, and outputs the variable length encoded difference 122, the variable length encoded AC coefficients 123 and the variable length encoded quantization table selection signal 136. The variable length decoding circuit 124 decodes the variable length encoded difference 122 and outputs the quantized difference 125. The difference decoding circuit 126 decodes the quantized DC coefficient 127 from the quantized difference 125. The variable length decoding circuit 128 decodes the variable length encoded AC coefficients 123, and outputs the quantized AC coefficients 129. The raster scan transformation circuit 130 converts the order of the zigzag scanned quantized AC coefficients 129 to a normal raster sequence, and outputs the raster scan quantized AC coefficients 131. The variable length decoding circuit 137 decodes the variable length encoded quantization table selection signal 136, and outputs the quantization table selection signal 138. The inverse quantization circuit 132 inverse quantizes for each block the quantization transformation coefficients obtained from the quantized DC coefficient 127 and AC coefficients 131, and outputs the inverse quantized transformation coefficients 133.

The inverse quantization circuit 132 applies inverse quantization using the same quantization table used by the compression apparatus because the quantization table can be identified by the quantization table selection signal 138. The discrete cosine inverse transformation circuit 134, which is the inverse orthogonal transformation means, applies discrete cosine inversion to the inverse quantized transformation coefficients 133, and outputs the expanded image data 135.

An image data compression and expansion apparatus comprised according to the present invention as described hereinabove can reproduce in the expanded image a good text image with no deterioration of the edge components even when text images and dot image areas are included in the image data, because the text areas and dot areas can be detected from the features of the transformation coefficients after orthogonal transformation, and the text areas are processed by quantization and inverse quantization of the transformation coefficients using a quantization table with relatively small quantization steps. Also, the dot areas are processed by quantization and inverse quantization of the transformation coefficients using a quantization table with relatively large quantization steps, so that a good expanded image can be obtained without lowering the compression rate by reducing the high frequency components.

Figure 12:
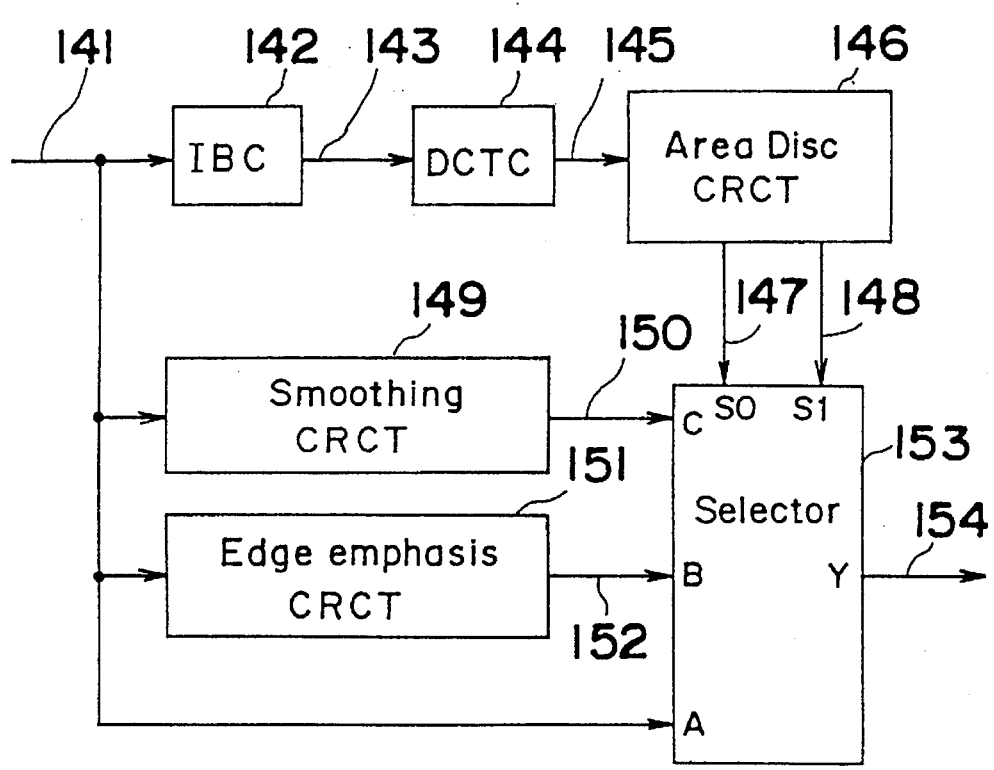
FIG. 12 is a block diagram of an image area discrimination apparatus according to a first embodiment of the present invention.

FIG. 12 is a block diagram of an image area discrimination apparatus according to a first embodiment of the present invention. An image blocking circuit 142 divides the input image data 141 into blocks of eight pixels square (8×8 pixels). The discrete cosine transformation circuit 144, which is the orthogonal transformation means, applies two-dimensional discrete cosine transform to the blocked input image data 143. The area discrimination circuit 146 outputs a HIGH text discrimination signal 147 when a text image area is contained in the blocked image signal based on the features of the transformation coefficients 145 for each block. In addition, the area discrimination circuit 146 also outputs a HIGH dot discrimination signal 148 when a dot area is contained in the blocked image signal. The smoothing circuit 149 smoothes the input image data 141, and outputs the smoothed image data 150. The edge enhancement circuit 151 applies an edge emphasizing processing to the input image data 141, and outputs the edge emphasized image data 152. The text discrimination signal 147 and dot discrimination signal 148 are input to the selection inputs S0 and S1, respectively, of the selector 153. The input image data 141, edge emphasized image data 152, and smoothed image data 150 are respectively input to data inputs A, B, and C, of the selector 153. The selector 153 then selects one of the three data inputs A, B, and C, according to the selection inputs, and outputs the area discrimination processed image data 154. The relationship between the selection inputs and the selected data inputs in the selector 153 is illustrated in FIG. 11.

Figure 13:
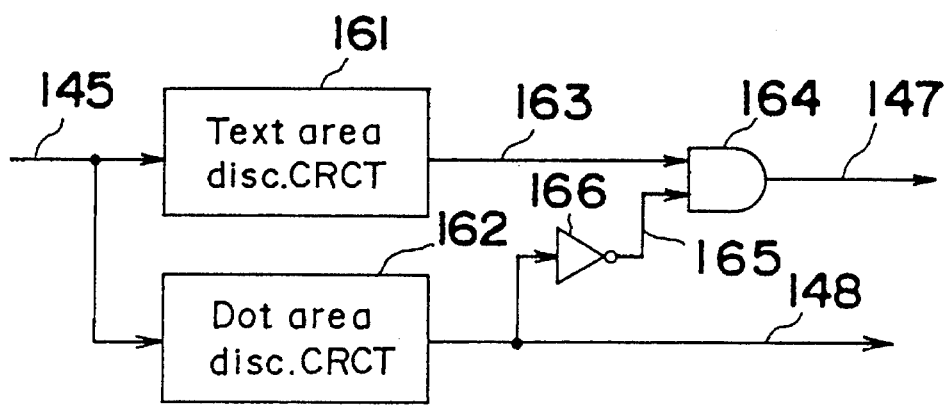
FIG. 13 is a block diagram of the area discrimination circuit 146 in FIG. 12.

FIG. 13 is a block diagram of the area discrimination circuit 146 in FIG. 12. The text area discrimination circuit 161 discriminates for each block whether a text image is contained in that block based on the features of the transformation coefficients 145, and outputs a HIGH discrimination signal 163 when the presence of a text image is determined. The dot area discrimination circuit 162 discriminates for each block whether a dot image is contained in that block based on the features of the transformation coefficients 145, and outputs a HIGH dot discrimination signal 148 when a dot image is determined present.

The inverter 166 inverts the dot discrimination signal 148 and outputs signal 165. The discrimination signal 163 and signal 165 are input to the AND gate 164, which outputs the text discrimination signal 147. The text discrimination signal 147 is HIGH when the discrimination signal 163 is HIGH and the dot discrimination signal 148 is LOW. The construction and operation of the text area discrimination circuit 161 are the same as those of the text area discrimination circuit 81 shown in FIG. 3. In addition, the construction and operation of the dot area discrimination circuit 162 are the same as those of the dot area discrimination circuit 82 in FIG. 3.

An image area discrimination processing apparatus comprised according to the present invention as thus described can detect text areas without false discrimination, can also discriminate dot areas, and can apply image processing appropriate to these areas by detecting the features of the transformation coefficients after orthogonal transformation, even when text areas and dot areas are contained in the image data.

It is to be noted that the edge enhancement circuit 151 in FIG. 12 may also be comprised of a binarization circuit or other processing circuit suited to text images. In addition, the smoothing circuit 149 in FIG. 12 may also be comprised of another processing circuit suited to dot pattern processing.

Figure 14:
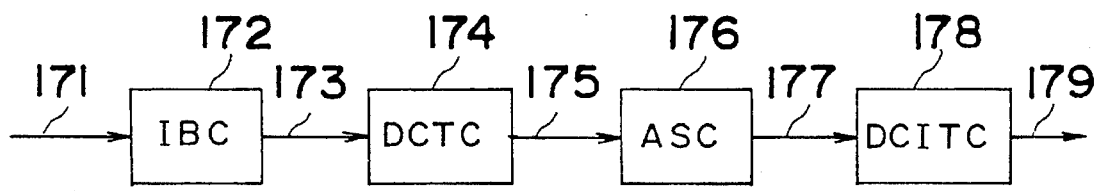
FIG. 14 is a block diagram of an image area discrimination apparatus according to a second embodiment of the present invention.

FIG. 14 is a block diagram of an image area discrimination processing apparatus according to a second embodiment of the present invention. An image blocking circuit 172 divides the input image data 171 into blocks of eight pixels square (8×8 pixels), and outputs a blocked input image data signal 173. The discrete cosine transformation circuit 174 applies two-dimensional discrete cosine transform to the blocked input image data signal 173, and outputs the transformation coefficients 175. The adaptive scaling circuit 176, which is the adaptive scaling means, selects the appropriate scaling coefficient table from among a plurality of predefined scaling coefficient tables based on the transformation coefficients 175 for each block, multiplies each AC coefficient by a scaling coefficient which differs according to the position of the transformation coefficient, and outputs the scaled transformation coefficients 177. The discrete cosine inverse transformation circuit 178 applies discrete inverse cosine transform to the scaled transformation coefficients 177, and outputs the area discrimination processed image data 179.

The adaptive scaling circuit 176 shown in FIG. 14 is described in detail below.

Figure 15:
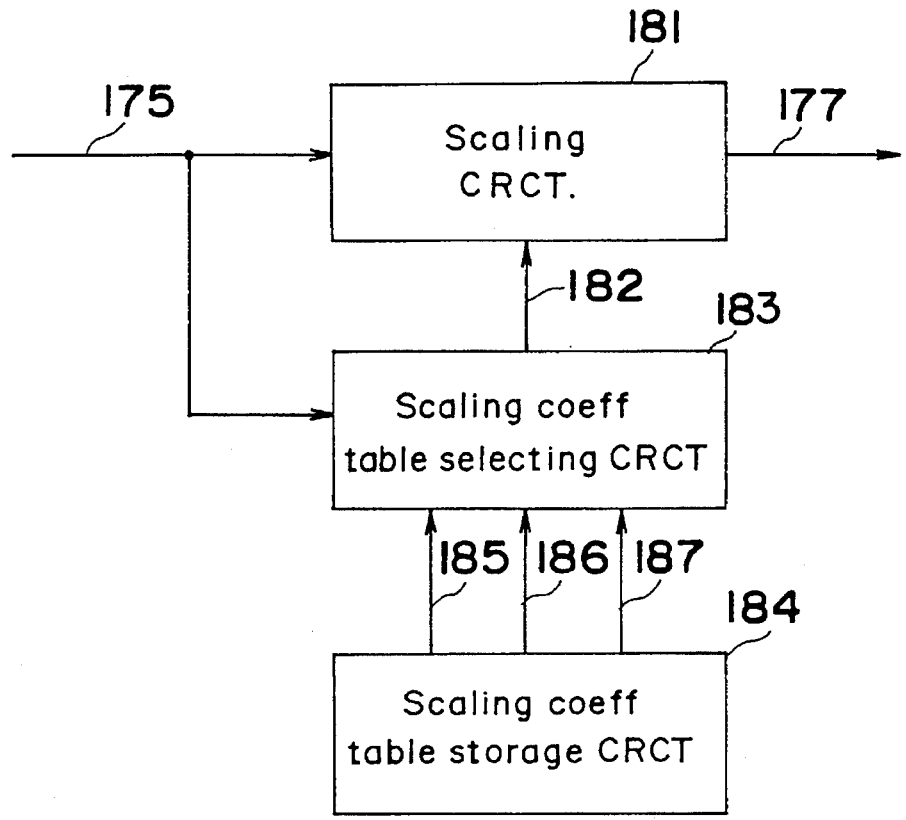
FIG. 15 is a block diagram of the adaptive scaling circuit 176 in FIG. 14.

FIG. 15 is a block diagram of the adaptive scaling circuit 176 in FIG. 14.

Figures 16A, 16B, 16C:
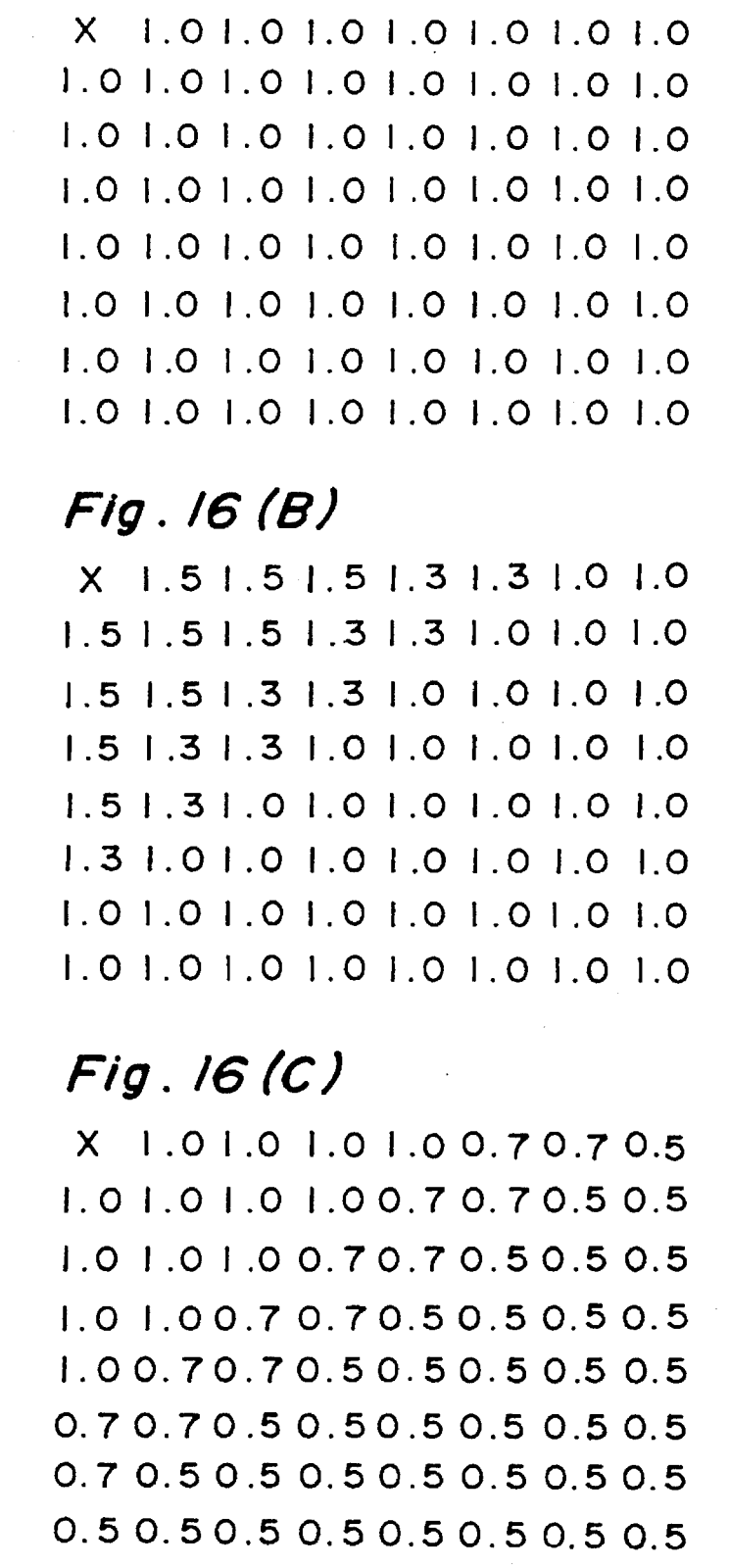

The scaling coefficient table storage circuit 184, which is the means for storing the scaling coefficient tables, stores three different scaling coefficient tables. These three scaling tables are shown in FIGS. 16(A), 16(B), and 16(C). The scaling coefficient table storage circuit 184 outputs the scaling coefficient table data signal 185 corresponding to FIG. 16(A). Similarly, the scaling coefficient table storage circuit 184 may also output scaling coefficient table data signals 186 and 187 corresponding to FIGS. 16(B) and 16(C). The scaling coefficient table selection circuit 183 selects one of the scaling coefficient table data signals 185, 186, and 187 according to the features of the transformation coefficients 175, and outputs the selected scaling coefficient table data signal 182. The scaling circuit 181 scales the transformation coefficients 175 using the selected scaling coefficient table data signal 182, and outputs scaled transformation coefficients 177, which include the DC coefficient and the scaled AC coefficients.

The scaling coefficient table selection circuit 183 shown in FIG. 15 is described in detail below with reference to the figures.

Figure 17:
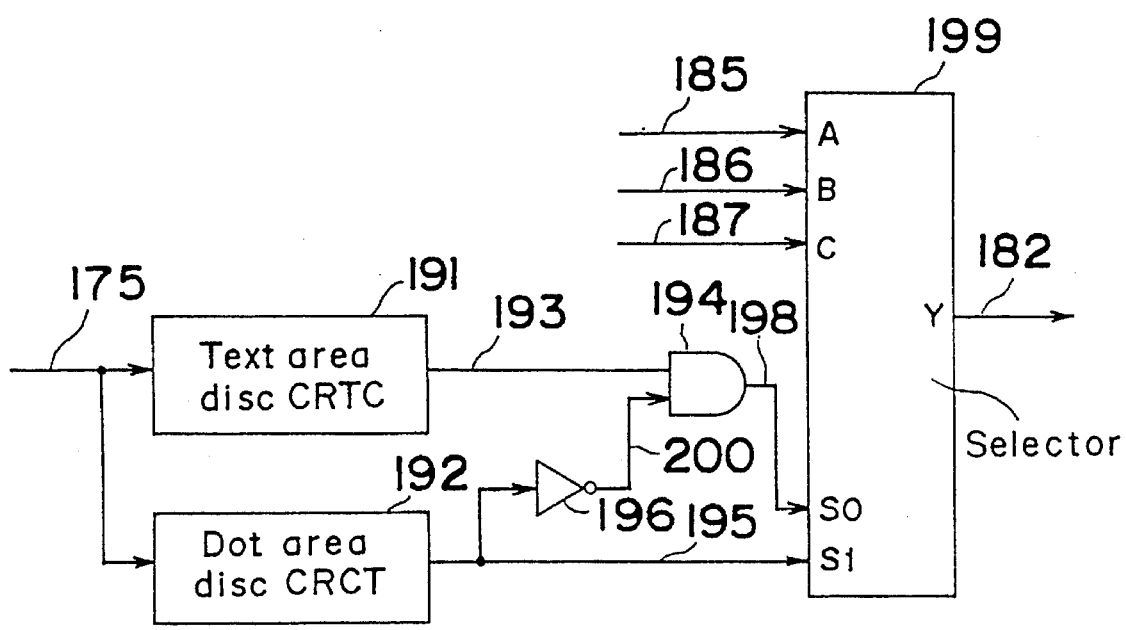
FIG. 17 is a block diagram of the scaling coefficient table selection circuit 183 in FIG. 15.
Figure 18:
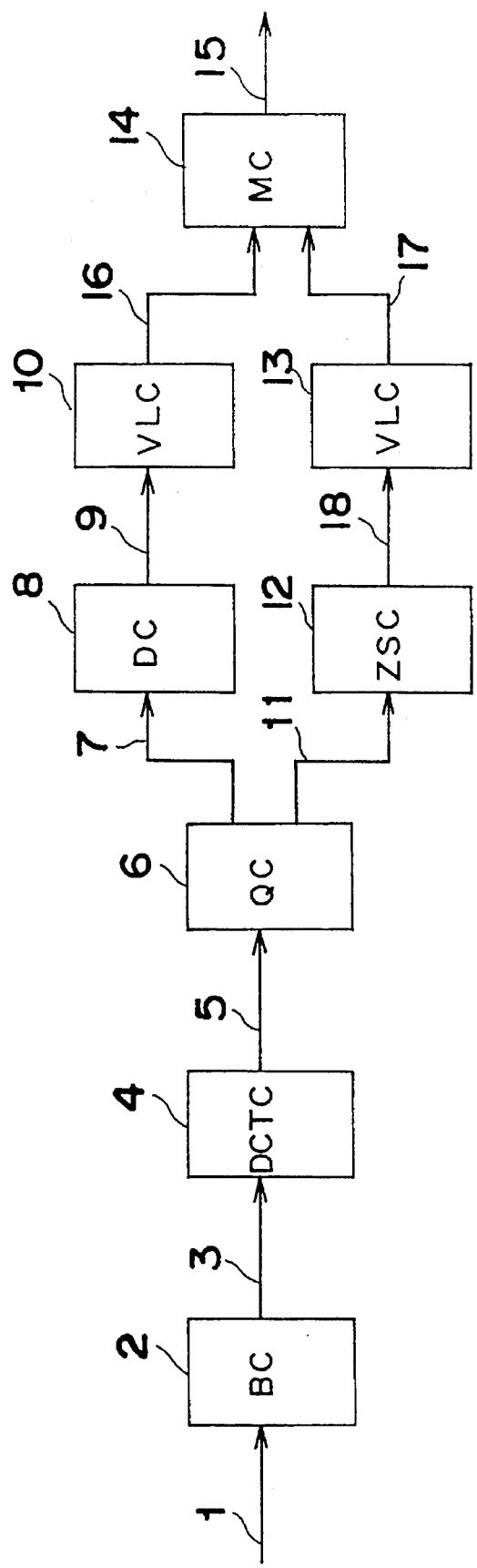
FIG. 18 is a block diagram of a conventional image signal compression apparatus.

FIG. 17 is a block diagram of the scaling coefficient table selection circuit 183 in FIG. 15.

Based on the features of the transformation coefficients 175, the text area discrimination circuit 191 discriminates for each block whether that block contains a text image, and outputs a HIGH discrimination signal 193 if it is determined that a text image is present. The dot area discrimination circuit 192 similarly discriminates, based on the features of the transformation coefficients 175, for each block whether that block contains a dot image, and outputs a HIGH dot discrimination signal 195 if it is determined that a dot image is present.

The inverter 196 inverts the dot discrimination signal 195 and outputs signal 200. The discrimination signal 193 and signal 200 are input to the AND gate 194, which outputs the text discrimination signal 198. The text discrimination signal 198 is HIGH when the discrimination signal 193 is HIGH and the dot discrimination signal 195 is LOW. The text discrimination signal 198 and the dot discrimination signal 195 are input to the selection inputs S0 and S1, respectively, of the selector 199. The scaling coefficient table data signals 185, 186, and 187 are input to data inputs A, B, and C, respectively, of the selector 199. The selector 199 selects one of the three data inputs based on the selection inputs, and outputs the selected scaling coefficient table data signal 182. The relationship between the selection inputs and the selected data inputs in the selector 199 is shown in FIG. 11. The construction and operation of the text area discrimination circuit 191 are the same as those of the text area discrimination circuit 81 shown in FIG. 3. In addition, the construction and operation of the dot area discrimination circuit 192 are the same as those of the dot area discrimination circuit 82 in FIG. 3.

An image area discrimination processing apparatus comprised according to the present invention as thus described can detect text areas without false discrimination, and can also discriminate dot areas by detecting the features of the transformation coefficients after orthogonal transformation even when text areas and dot areas are contained in the same image data. Moreover, by amplifying the high frequency components for image data identified as a text area and emphasizing the edge components, the image can be processed with enhanced quality in the text image area, and the high frequency components can be suppressed for image data identified as a dot image area for smoother gradation.

An image data compression and expansion apparatus comprised according to the present invention as described hereinabove can reproduce in the expanded image a good text image when text images and dot image areas are included in the image data by providing an adaptive quantization means which detects the features of the transformation coefficients after orthogonal transformation and quantizes the transformation coefficients using an optimized quantization table, and can obtain a good expanded image without lowering the compression rate by reducing the high frequency components, even when text images and dot image areas are included in the same image data.

Moreover, an image area discrimination processing apparatus comprised according to the present invention can discriminate text areas without false discrimination and can also discriminate dot areas even when text areas and dot areas are contained in the same image data by providing a means to detect the features of the transformation coefficients after orthogonal transformation and discriminate the area.

In addition, an image area discrimination processing apparatus comprised according to the present invention can process the image data to improve the quality of the text image area by amplifying the high frequency components and increasing the edge components for image data discriminated as a text area, and can obtain a smooth gradation in image data discriminated as a dot area by suppressing the high frequency component, by providing a means to multiply a scaling coefficient appropriate to the discriminated area by the AC coefficients after orthogonal transformation.

It is to be noted that when the input image is a color separation signal, a photogravure image can be substituted for the dot image discussed in the present embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image compression apparatus comprising:
   a dividing means for dividing image data into plural blocks;
   an orthogonal transformation means for orthogonally transforming each block divided by said dividing means and outputting a DC transformation coefficient and a plurality of AC transformation coefficients;
   an adaptive quantization means for quantizing the DC and AC transformation coefficients in each block, said adaptive quantization means including,
      an absolute value calculation means for calculating absolute values of said plurality of the AC transformation coefficients for each block,
      an identifying means for identifying a block type for each block among a plurality of block types based on the absolute values of the AC transformation coefficients for each block, said plurality of block types including a text block type containing text image and a dot image block type containing half tone dot image,
      a quantization storage means for storing plural different quantization tables,
      a selection means for selecting one of the stored quantization tables in accordance with the block type identified for each block, and
      a means for quantizing said DC transformation coefficient and said AC transformation coefficients using the selected quantization table; and
   an encoding means for encoding the quantized DC and AC transformation coefficients.

2. An image compression apparatus according to claim 1 wherein the orthogonal transformation means is characterized by applying discrete cosine transform.

3. An image compression apparatus according to claim 1 wherein said identifying means includes a summation means for calculating a sum of absolute values of AC transformation coefficients of low frequency components within a predetermined low frequency range and identifies the block type of each block as the text block type when said sum calculated by said calculation means is larger than a predetermined threshold value; and wherein said quantization table selecting means, when the text block type is identified, selects a quantization table for which quantization steps, which are elements of the quantization table, are smallest relative to those of the other non-selected quantization tables.

4. An image compression apparatus according to claim 1 wherein said identifying means includes a first summation means for calculating a first sum of absolute values of AC transformation coefficients of high frequency components within a predetermined high frequency range and a second summation means for calculating a second sum of absolute values of AC transformation coefficients of low frequency components within a predetermined low frequency range, said identifying means identifying the block type of each block as the dot image block type when said first sum is larger than said second sum, and wherein said quantization table selecting means, when the dot image block type is identified, selects a quantization table for which quantization steps, which are elements of the quantization table, are largest relative to those of the other non-selected quantization tables.

5. An image compression apparatus according to claim 1 wherein said identifying means comprises:

a first summation means for calculating a first sum of absolute values of AC transformation coefficients of high frequency components within a predetermined high frequency range, which are subset of the AC transformation coefficients;

a second summation means for calculating a second sum of absolute values of AC transformation coefficients of low frequency components within a predetermined first low frequency range, which are subset of the AC transformation coefficients; and a third summation means for calculating a third sum of absolute values of AC transformation coefficients of low frequency components within a predetermined second low frequency range which are subset of the AC transformation coefficients; and wherein said identifying means identifies the block type of each block as the dot image type when said first sum is larger than said second sum, and when the dot image block type is identified, said selection means selects a quantization table for which quantization steps, which are elements of the quantization table, are largest relative to those of the other non-selected quantization tables, and said identifying means identifies the block type of each block as the text image type when said third sum is larger than a predetermined threshold value, provided that the block type is not identified to be the dot image block type, and when the text image type is identified said selection means selects a quantization table for which quantization steps, which are elements of the quantization table, are smallest relative to those of the other non-selected quantization tables.

6. A image compression apparatus according to claim 1, further comprising an image expansion apparatus for expanding a compressed image signal, wherein said image expansion apparatus comprises:

an inverse quantization means to inverse quantize the quantized DC and AC transformation coefficients for each specific block type using the quantization table used for quantization; and an orthogonal inverse transformation means to orthogonally inversely transform the inversely quantized DC and AC transformation coefficients.

7. An image area discrimination processing apparatus comprising:

a means for dividing image data into plural blocks;

an orthogonal transformation means for orthogonally transforming each block of divided image data and outputting a DC transformation coefficient and a plurality of AC transformation coefficients;

a summation means for calculating a sum of absolute values of AC transformation coefficients of low frequency components within a predetermined low frequency range, which are subset of the AC transformation coefficients;

a comparing means for comparing said sum with a predetermined threshold value; and a text area discrimination means to identify a block type of each block as a text image block when the sum is greater than said predetermined threshold value.

8. An image area discrimination processing apparatus comprising:

a means for dividing image data into plural blocks;

an orthogonal transformation means for orthogonally transforming each block of divided image data and outputting a DC transformation coefficient and a plurality of AC transformation coefficients;

a first summation means for calculating a sum of absolute values of AC transformation coefficients of high frequency components within a predetermined high frequency range, which are subset of the AC transformation coefficients;

a second summation means for calculating a sum of absolute values of AC transformation coefficients of low frequency components within a predetermined low frequency range, which are subset of the AC transformation coefficients;

a comparing means for comparing the sum calculated by the first summation means with the sum calculated by the second summation means; and a dot area discrimination means to identify a block type of each block as a dot image block when the sum calculated by the first summation means is greater than the sum calculated by the second summation means.

9. An image area discrimination processing apparatus comprising:

a means for dividing image data into plural blocks;

an orthogonal transformation means for orthogonally transforming each block of divided image data and outputting a DC transformation coefficient and a plurality of AC transformation coefficients;

a first summation means for calculating a sum of absolute values of AC transformation coefficients of high frequency components within a predetermined high frequency range, which are subset of the AC transformation coefficients;

a second summation means for calculating a sum of absolute values of AC transformation coefficients of low frequency components within a predetermined first low frequency range, which are subset of the AC transformation coefficients;

a first comparing means for comparing the sum calculated by the first summation means with the sum calculated by the second summation means;

a dot area discrimination means to identify a block type of each block as a dot image block when the sum calculated by the first summation means is greater than the sum calculated by the second summation means;

a third summation means for calculating a sum of absolute values of AC transformation coefficients of low frequency components within a predetermined second low frequency range which are subset of the AC transformation coefficients;

a second comparing means for comparing the sum calculated by the third summation means with a predetermined threshold value; and a text area discrimination means to identify a block type of each block as a text image block when the sum calculated by the third summation means is greater than predetermined threshold level and the block is not discriminated to be a dot image block by said dot area discriminating means.

10. An image area discrimination processing apparatus according to claims 7, 8, or 9 wherein the orthogonal transformation means is characterized by applying discrete cosine transform.

11. An image area discrimination processing apparatus comprising:

a dividing means for dividing image data into plural blocks;

an orthogonal transformation means for orthogonally transforming each block of divided image data and outputting a DC transformation coefficient and a plurality of AC transformation coefficients;

an adaptive scaling means for scaling the AC transformation coefficients in each block;

an orthogonal inverse transformation means for applying orthogonal reverse transform to the DC transformation coefficient and the scaled AC transformation coefficients for each block; and wherein said adaptive scaling means includes, an absolute value calculation means for calculating absolute values of said plurality of the AC transformation coefficient for each block, an identifying means for identifying a block type for each block among a plurality of block types, which include at least a text block type containing text image and a dot image block type containing halftone dot image, based on the absolute values of the AC transformation coefficients;

a scaling coefficient table storage means for storing a plurality of scaling coefficient tables, a scaling coefficient table selection means for selecting one of the stored scaling coefficient tables in accordance with the block type identified for each block, and a scaling means for scaling the AC transformation coefficients according to the selected scaling coefficient table.

12. An image area discrimination processing apparatus according to claim 11 wherein the orthogonal transformation means is characterized by applying discrete cosine transform.

13. An image area discrimination processing apparatus according to claim 11 wherein said identifying means comprises a summation means for calculating a sum of the absolute values of AC transformation coefficients of low frequency components within a predetermined low frequency range, and, wherein said identifying means compares said sum calculated by said summation means with a predetermined threshold value and if said sum calculated by said summation means is greater than said predetermined threshold value, said identifying means identifies the block type for each block to be a text block type and said scaling coefficient table selecting means selects a scaling coefficient table for which the scaling coefficients, which are elements of the scaling coefficient tables, are the largest relative to the scaling coefficients of the other non-selected scaling coefficient tables.

14. An image area discrimination processing apparatus according to claim 11 wherein said identifying means comprises a first summation means for calculating a first sum of absolute values of AC transformation coefficients of high frequency components within a predetermined high frequency range, a second summation means for calculating a second sum of absolute values of AC transformation coefficients of low frequency components within a predetermined low frequency range, and a comparing means for comparing the first sum with the second sum, if the first sum is larger than the second sum, said identifying means identifies the block type of each block to be a dot image type and said scaling coefficient table selecting means selects a scaling coefficient table having smallest scaling coefficients among said plurality of scaling coefficient tables.

15. An image area discrimination processing apparatus according to claim 11 wherein said means for identifying comprises:

a first summation means for calculating a first sum of absolute values of AC transformation coefficients of high frequency components within a predetermined high frequency range, which are subset of the AC transformation coefficients;

a second summation means for calculating a second sum of absolute values of AC transformation coefficients of low frequency components within a predetermined first low frequency range, which are subset of the AC transformation coefficients; and a third summation means for calculating a third sum of absolute values of AC transformation coefficients of low frequency components within a predetermined second low frequency range, which are subset of the AC transformation coefficients; and wherein said identifying means identifies the block type of each block as the dot image type when said first sum is larger than said second sum, and when the dot image block type is identified, said scaling coefficient table selecting means, selects a scaling coefficient table having smallest scaling coefficients among said plurality of scaling coefficient tables, and said identifying means identifies the block type of each block to be the text image type when said first sum is not larger than the second sum and the third sum is larger than a predetermined threshold value, and when the text image block type is identified said scaling coefficient table selecting means selects a scaling coefficient table having largest scaling coefficients among said plurality of scaling coefficient tables.

* * * * *